Patented May 19, 1931

1,805,472

UNITED STATES PATENT OFFICE

JOHANN GRIVIN, OF RIGA, LATVIA

PROCESS AND DEVICE FOR TREATING FUEL AIR MIXTURES FOR INTERNAL COMBUSTION ENGINES

Application filed December 1, 1927, Serial No. 237,094, and in Latvia December 4, 1926.

The invention relates to a process and device for treating fuel-air-mixtures for internal combustion engines. According to the present invention, the fuel-air-mixture coming from the carburettor is subjected to a special treatment thus, that the fuel-air-mixture is first freed by filtering, preferably centrifugal filtering, from all the heavy, not sufficiently atomized fuel-particles. These separated fuel-particles are passed to a special chamber, where they are evaporated by the exhaust-gases of the engine and the vapours returned to the original fuel-air-mixture. The fuel-air-mixture is thereupon highly heated by the exhaust-gases of the engine and cold secondary fresh air adjustably admitted to the same for the purpose of condensing said mixture in such a manner that a uniform vaporous fog is produced. The highly superheated gases are hereafter passed together with the fresh air through a mixing-centrifugal and finally supplied to the cylinders.

The present process offers the extraordinary advantage, that even difficultly combustible fuels, as for instance heavy oils, petroleum and alcohol can readily be used without any special preliminary treatment and a considerable saving is likewise obtained under employment of benzene.

A particular advantage of the present process consists in the extraordinary elastic working of the engines, without the slightest knocking. For carrying the process into effect, a device is installed between the carburettor and the engine and in said device the gases are first passed through a filter in form of a centrifugal. The heavy, not gasified particles are thrown by said centrifugal into an annular space, in which they are evaporated by being highly heated. A heat interchanging apparatus is disposed above the centrifugal, through which the exhaust-gases of the motor are passed separately from the fuel-air-mixture.

Tongues are provided above the said heat interchanging apparatus by means of which secondary fresh air is admitted. The secondary fresh air is mixed by a whirl with the highly superheated fuel-air-mixture and thereupon admitted to the engine.

In the accompanying drawings a device according to the invention is illustrated by way of example.

Figure 2:
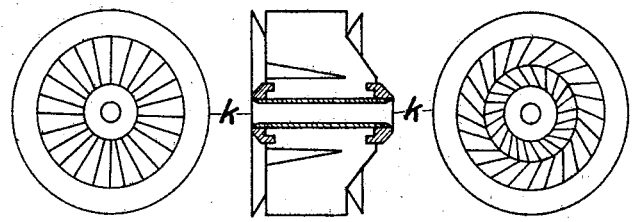
Fig. 2 is a plan-view, a longitudinal section and a bottom-view of the centrifugal.
Figure 3:
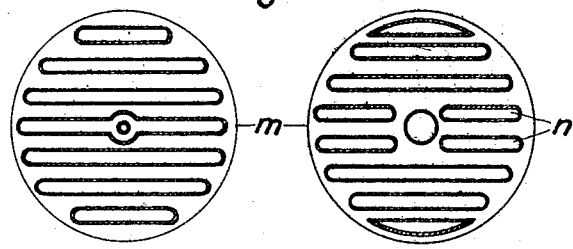
Fig. 3 shows a cross-section of two modes of construction of the heat interchanging apparatus.
Figure 5:
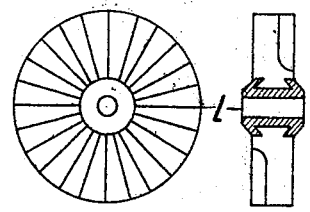
Fig. 5 shows a plan view and a longitudinal section of the centrifugal for mixing the secondary fresh air with the original fuel-air-mixture.
Figure 4:
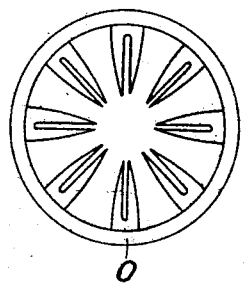
Fig. 4 is a plan-view of a ring with inwardly directed tongues, by means of which the fresh air is supplied to the highly superheated fuel-air-mixture.

The body $a$ of the device, carries three rotatable rings $b$, $c$, $d$, forming together with the main body $a$ three annular air-spaces $e$, $f$, $g$. These rings are preferably arranged rotatable towards each other to facilitate fitting of the different connecting-pipes, supported by these rings. A by-pass-line $z$ for the exhaust-gases passing the pipe $z'$ is connected with the rings $b$ and $c$. The ring $d$ carries the supply for the secondary fresh air. Inside of the casing $a$, a shaft $j$ is supported by bearings of the ring-nuts $h$, upon the lower end of which a centrifugal wheel $k$ (Figs. 1 and 2) is mounted, which has a conical ring $k'$ disposed below it for directing the fuel air mixture coming from the carburetor to the center of said wheel $k$. An inverted conical ring $k''$ is provided above the wheel $k$. This shaft $j$ passes through the central opening of the heat interchanging apparatus $m$, $n$ (Fig. 3). The upwards projecting end of the shaft $j$, carries the turbine wheel $l$, illustrated in Fig. 5. The end of the shaft is held in position by bearing $i$.

Figure 1:
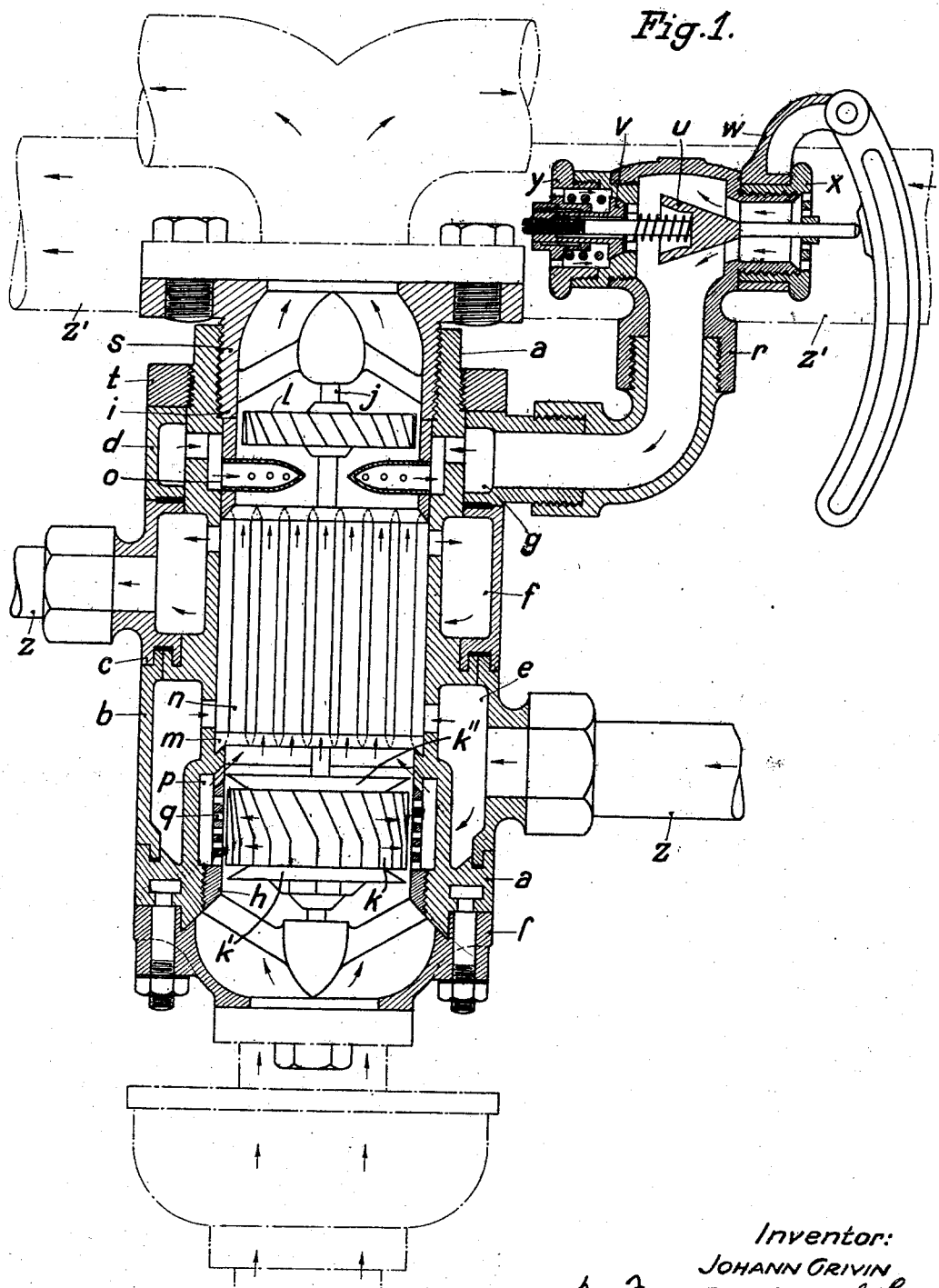
Fig. 1 illustrates the apparatus in a vertical longitudinal section.
Figure 6:
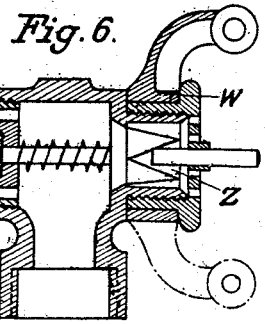
Fig. 6 is a longitudinal section through the regulating-device for the secondary fresh air.

Above the heat interchanging apparatus $m$, $n$ a ring $o$ is mounted in the casing $a$. This ring $o$ carries inwardly directed tongues, provided with several lateral directed bores, as shown in Fig. 1. These tongues of the ring o are hollow, serving as inlet-openings for the fresh air from the ring-chamber d to the fuel-air-mixture current. The secondary fresh air is admitted by an adjustable valve u, v, w, x, y. This valve can be designed according to Fig. 1 or 6.

The above described apparatus is composed in such a manner, that the pipe connections of the rings e and f are connected with a by-pass-line of the exhaust-gases, while the fresh air is admitted to the chamber of the ring d by th pipe-elbow r.

The mode of action of the apparatus is as follows: The fuel-air-mixture coming from the carburettor enters the casing a from below, passes the centrifugal k; the lighter, fine enough atomized fuel-particles of the fuel-air-mixture penetrate the centrifugal vertically, and enter the heat interchanging apparatus m, n. The heavy fuel-particles, not sufficiently atomized, are thrown by the centrifugal through openings q into the ring-chamber p. The exhaust-gases of the engine enter the chamber of the ring b by way of the by-pass-line and heat the fuel-volume contained in the annular chamber p; said fuel volume is evaporated and the escaping vapours mix again with the sufficiently atomized part of the fuel-air-mixture. The exhaust-gases pass thereupon through the upper openings of the chamber e into the heat interchanging apparatus and enter through the upper openings of the annular chamber f the annular chamber of the ring o and hence into the exhaust.

The fuel-air-mixture is heated by the said heat interchanging apparatus and passes thereafter the tongues of the ring o. Through the openings of said tongues cold secondary fresh air is admitted condensing the fuel-air-mixture in such a manner that a uniform vaporous fog is produced. This fog is whirled particularly by the centrifugal wheel i and admitted to the cylinders. The wheels k and l upon the shaft j are rotated by the current of the fuel-air-mixture.

The present arrangement enables ready starting with cold cylinders under employment of alcohol and the like, without necessitating a special heating device or other auxiliaries.

On the basis of experiments made, the saving by the present arrangement can be estimated at 30%.

I claim:—

1. A method of producing a homogeneous mixture of liquid fuels and air, comprising separating the insufficiently atomized fuel particles of the fuel air mixture coming from the carburetor, collecting and vaporizing the separated fuel particles in a special vaporizing chamber mixing the separated and vaporized fuel particles with the fuel air steam, superheating the mixture and by adding of secondary air at atmospheric pressure cooling down the mixture until the beginning of a fog in the fuel air steam.

2. A fuel air interceptor comprising conical rings being connected to the lower and upper face of the centrifugal wheel respectively so as to direct the fuel mixture toward and away from the centre of the wheel respectively.

3. A fuel air interceptor comprising a centrifugal wheel, a heating chamber round the centrifugal wheel, a superheater above the centrifugal wheel, tongue-shaped secondary air inlets above the said superheater, a mixing wheel coupled with the centrifugal wheel above the said tongue-shaped air inlets, the mixing wheel being adapted to serve as a driving element to the centrifugal wheel.

In testimony whereof I have affixed my signature.

JOHANN GRIVIN.